(12) United States Patent
Giacomazza

(10) Patent No.: US 6,223,866 B1
(45) Date of Patent: May 1, 2001

(54) DAMPED PAD SPRING FOR USE IN A DISC BRAKE ASSEMBLY

(75) Inventor: Charles Giacomazza, Royal Oak, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/607,047

(22) Filed: Jun. 30, 2000

(51) Int. Cl.[7] ..................................................... F16D 55/04
(52) U.S. Cl. ..................................... 188/73.38; 188/73.36
(58) Field of Search ............................... 188/73.35–73.38

(56) References Cited

U.S. PATENT DOCUMENTS

| | | | |
|---|---|---|---|
| 3,684,061 | * 8/1972 | Ogawa et al. | 188/73.37 |
| 4,429,769 | * 2/1984 | Oshima et al. | 188/73.38 |
| 4,446,192 | 5/1984 | Dehlen . | |
| 4,865,163 | * 9/1989 | Kondo | 188/73.38 |
| 5,377,790 | * 1/1995 | Tsuruta | 188/73.38 |
| 5,381,875 | * 1/1995 | Tsuruta et al. | 188/73.38 |
| 5,447,594 | 9/1995 | Josefsson . | |
| 5,853,070 | 12/1998 | Josefsson . | |

FOREIGN PATENT DOCUMENTS

014731 * 9/1983 (JP) .................................... 188/73.38

WO 95/29060 11/1995 (WO) .
WO 96/30205 10/1996 (WO) .

* cited by examiner

Primary Examiner—Chris Schwartz
(74) Attorney, Agent, or Firm—MacMillan, Sobanski & Todd, LLC

(57) ABSTRACT

This invention related to a multi-layered damped pad spring adapted for use in a disc brake assembly. The disc brake assembly includes an anchor bracket adapted to be secured to a vehicle component, a brake caliper adapted to be secured to the anchor bracket, a pair of friction pads carried by the disc brake assembly and adapted to be disposed on opposite axial sides of an associated brake rotor, and actuation means for selectively moving the friction pads into frictional engagement with the rotor. The pad spring is carried by the disc brake assembly and is disposed between the anchor bracket and at least one end of one of the pair of friction pads. In a preferred embodiment, the pad spring is a multi-layered pad spring and includes an outer layer disposed adjacent the friction pad and in contact with at least a portion thereof, and an inner layer disposed adjacent the anchor bracket and in contact with at least a portion thereof. The outer layer is formed from a first material and the inner layer formed from a second material. Preferably, the first material is metal and the second material is a damping material which covers the entire inner surface of the metal outer layer and is applied thereto prior to the forming of the pad spring by a stamping operation.

17 Claims, 7 Drawing Sheets

DAMPED PAD SPRING FOR USE IN A DISC BRAKE ASSEMBLY

BACKGROUND OF THE INVENTION

This invention relates in general to vehicle disc brake assemblies and in particular to an improved structure for a damped pad spring adapted for use in such a vehicle disc brake assembly. Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a brake rotor which is secured to a wheel of the vehicle for rotation therewith. The disc brake assembly further includes a caliper assembly which is slidably supported on pins secured to an anchor bracket. The anchor bracket is secured to a non-rotatable component of the vehicle, such as the axle flange or steering knuckle, connected to the vehicle frame. The caliper assembly includes a pair of friction pads or brake shoes which are disposed on opposite sides of the brake rotor. The friction pads are connected to one or more hydraulically or pneumatically actuated pistons for movement between a non-braking position, wherein they are spaced apart from opposed axial sides or braking surfaces of the brake rotor, and a braking position, wherein they are moved into frictional engagement with the opposed braking surfaces of the brake rotor. When an operator of the vehicle depresses the brake pedal, the piston urges the friction pads from the non-braking position to the braking position so as to frictionally engage the opposed braking surfaces of the brake rotor and thereby slow or stop the rotation of the associated wheel of the vehicle.

When the disc brake assembly is not actuated, the friction pads are normally spaced apart from the opposite sides of the rotor. Because they are not positively engaged with the rotor, the friction pads are free to move relative to other brake and vehicle components during vehicle operation. Vehicle induced vibration loads can result in an undesirable rattle or other noises. To prevent this from occurring, it is known to provide an anti-rattle clip in the disc brake assembly. The anti-rattle clip is typically embodied as a spring metal member having leg portions which spring load each of the friction pads against a non-moving component of the disc brake assembly. The anti-rattle clip exerts a relatively small force against the associated friction pad which prevents it from rattling while limiting pad sliding resistance to an optimum level when the disc brake assembly is disengaged. A number of anti-rattle clip structures are known in the art for use with the friction pads of disc brake assemblies.

SUMMARY OF THE INVENTION

This invention related to an improved structure for a damped pad spring adapted for use in a disc brake assembly. The disc brake assembly includes an anchor bracket adapted to be secured to a vehicle component, a brake caliper adapted to be secured to the anchor bracket, a pair of friction pads carried by the disc brake assembly and adapted to be disposed on opposite axial sides of an associated brake rotor, and actuation means for selectively moving the friction pads into frictional engagement with the rotor. The pad spring is carried by the disc brake assembly and is disposed between the anchor bracket and at least one end of one of the pair of friction pads. In a preferred embodiment, the pad spring is a multi-layered pad spring and includes an outer layer disposed adjacent the friction pad and in contact with at least a portion thereof, and an inner layer disposed adjacent the anchor bracket and in contact with at least a portion thereof. The outer layer is formed from a first material and the inner layer formed from a second material. Preferably, the first material is metal and the second material is a damping material which covers the entire inner surface of the metal outer layer and is applied thereto prior to the forming of the pad spring by a stamping operation.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
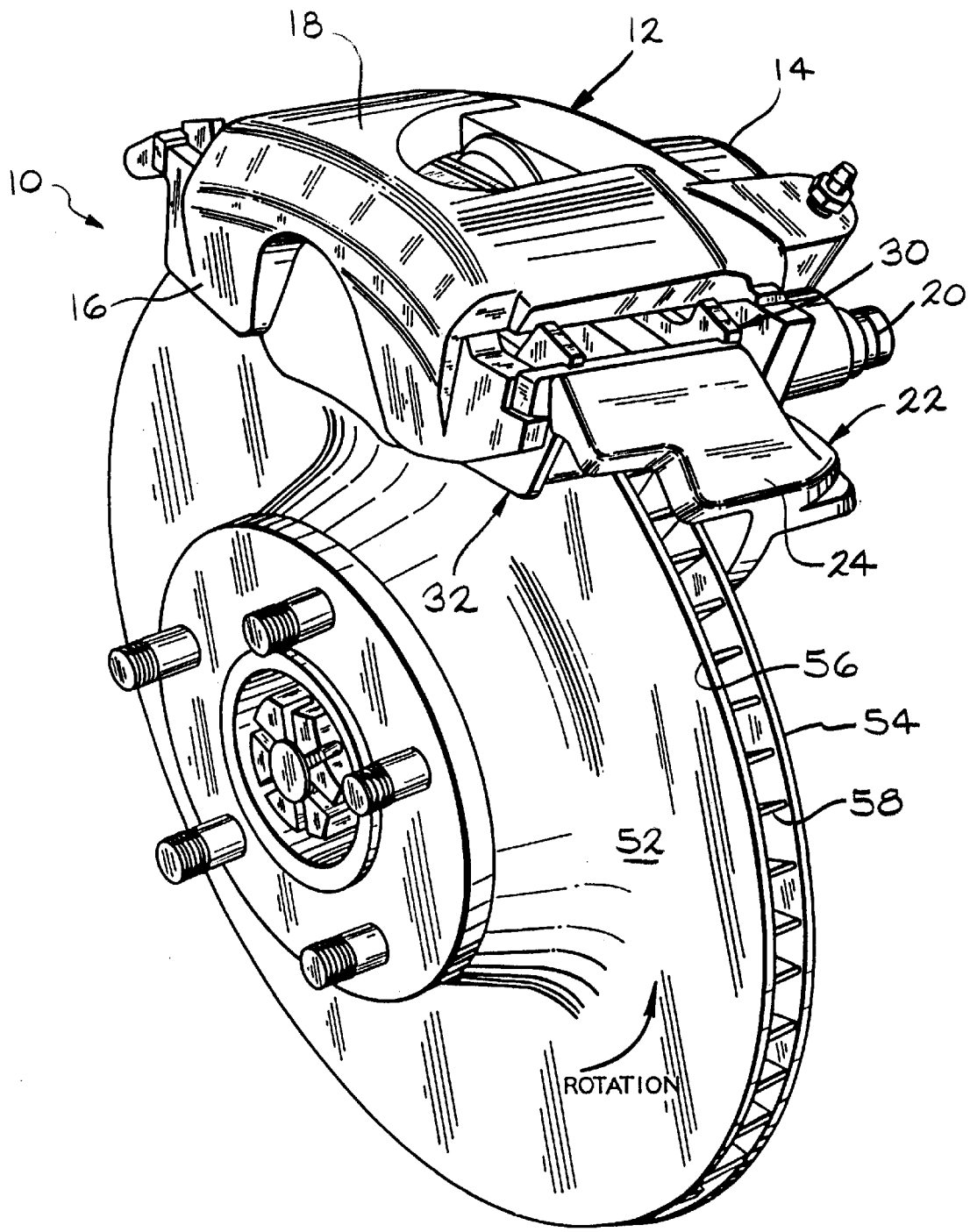
FIG. 1 is a perspective view of a prior art vehicle disc brake assembly.
Figure 2:
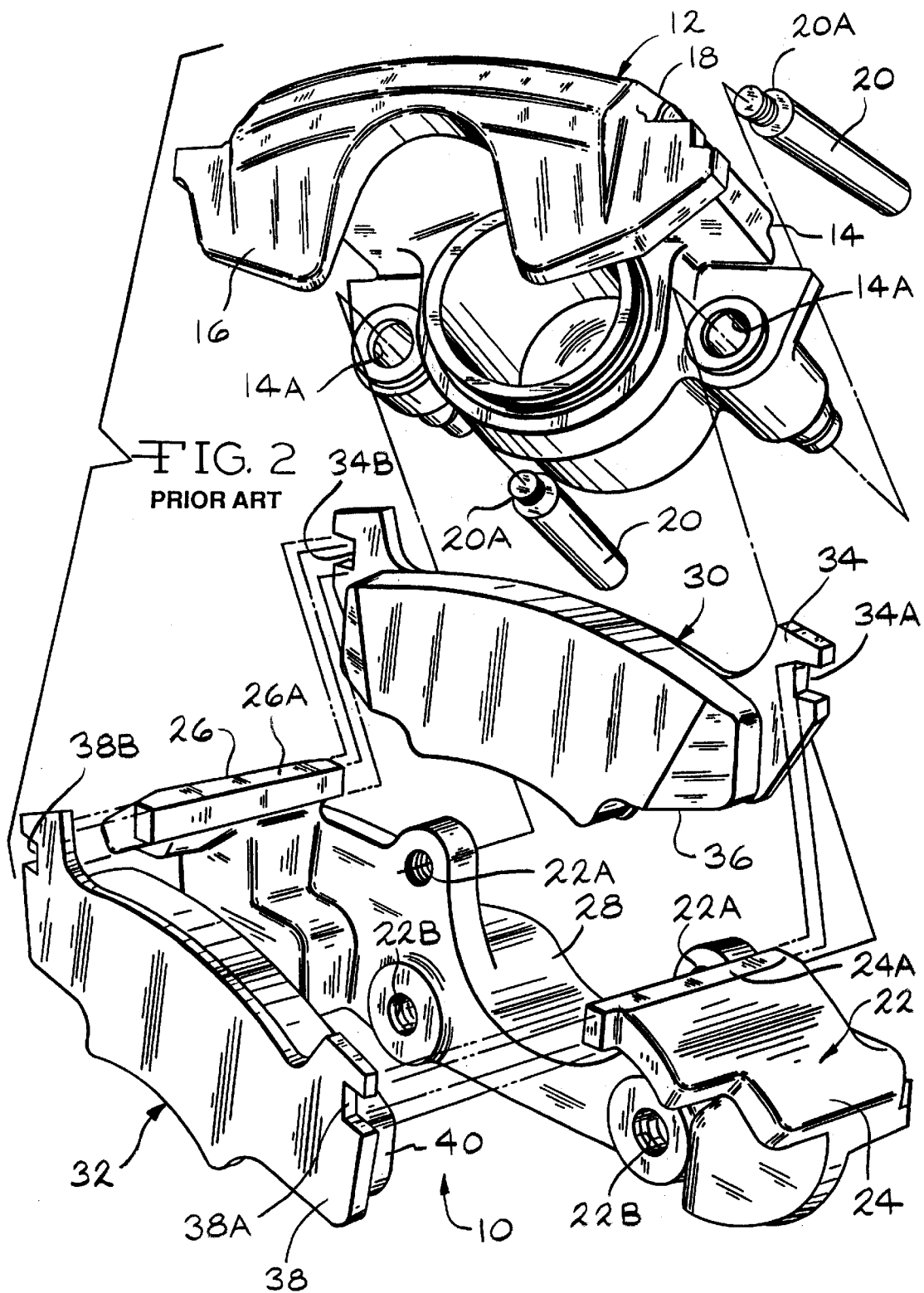
FIG. 2 is an exploded perspective view of selected components of the prior art vehicle c brake assembly illustrated in FIG. 1.
Figure 3:
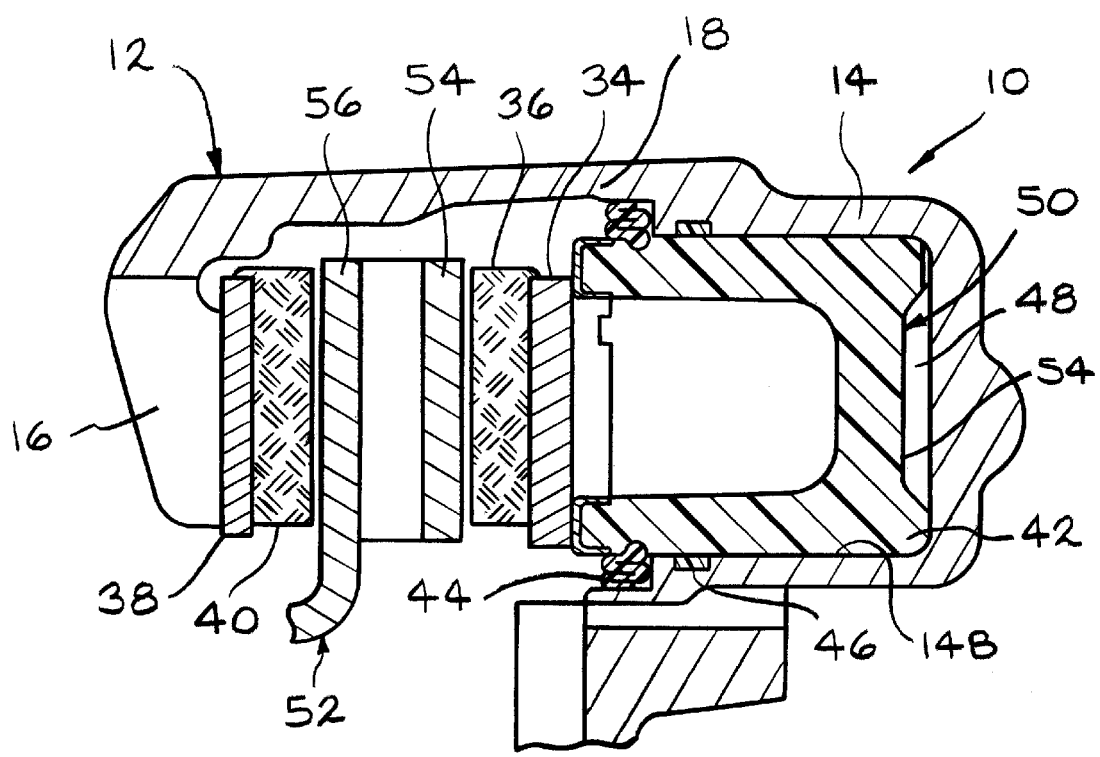
FIG. 3 is a sectional elevational view of a portion of prior art vehicle disc brake assembly illustrated in FIGS. 1 and 2.

Referring now to the drawings, there is illustrated in prior art FIGS. 1 through 3 a portion of a prior art vehicle disc brake assembly, indicated generally at 10. The general structure and operation of the prior art disc brake assembly 10 is conventional in the art. Thus, only those portions of the prior art disc brake assembly 10 which are necessary for a full understanding of this invention will be explained and illustrated.

The prior art disc brake assembly 10 is a sliding type of disc brake assembly and includes a generally C-shaped caliper, indicated generally at 12. The caliper 12 includes an inboard leg portion 14 and an outboard leg portion 16 which are interconnected by an intermediate bridge portion 18. The caliper 12 is slidably supported on a pair of pins 20 secured to an anchor bracket, indicated generally at 22. The anchor bracket 22 is, in turn, secured to a stationary component of the vehicle. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

The pins 20 extend through non-threaded apertures 14A formed in the inboard leg 14 of the caliper 12. The pins 20 have respective threaded ends 20A which are received in threaded apertures 22A provided in anchor bracket 22. The pins 20 support the caliper 12 for sliding movement relative to the anchor bracket 22 in both the outboard direction (left when viewing prior art FIG. 3) and the inboard direction (right when viewing prior art FIG. 3). Such sliding movement of the caliper 12 occurs when the disc brake assembly 10 is actuated, as will be explained below. A pair of bolts (not shown) extend through associated apertures formed in the stationary vehicle component and are received in a pair of threaded apertures 22B formed in the anchor bracket 22 to thereby secure the anchor bracket 22 to the stationary vehicle component. Alternatively, other known securing methods can be used to secure the anchor bracket 22 to the stationary vehicle component.

As best shown in prior art FIG. 2, the anchor bracket 22 includes a pair of axially and outwardly extending arms 24 and 26 which are interconnected at their inboard ends by an inner tie bar 28. The arms 24 and 26 have upstanding guide rails 24A and 26A, respectively formed thereon. The guide rails 24A and 26A extend transverse to the arms 24 and 26, respectively, and parallel to one another. The guide rails 24A and 26A slidably support an inboard brake shoe, indicated generally at 30, and an outboard brake shoe, indicated generally at 32, respectively.

The inboard brake shoe 30 includes a backing plate 34 and a friction pad 36. The inboard backing plate 34 includes opposed ends having notches 34A and 34B formed therein, for supporting the inboard brake shoe 30 on the guide rails 24A and 26A of the anchor bracket 22. The outboard brake shoe 32 includes a backing plate 38 and a friction pad 40. The outboard backing plate 38 includes opposed ends having notches 38A and 38B formed therein, for supporting the outboard brake shoe 32 on the guide rails 24A and 26A of the anchor bracket 22. Alternatively, the inboard brake shoe 30 can be supported on a brake piston of the prior art disc brake assembly 10, while the outboard brake shoe 32 can be supported on the outboard leg portion 16 of the caliper 12.

An actuation means, indicated generally at 50 in prior art FIG. 3, is provided for effecting the operation of the disc brake assembly 10. The actuation means 50 includes a brake piston 42 which is disposed in a counterbore or recess 14B formed in the outboard surface of the inboard leg 14 of the caliper 12. The actuation means 50, shown in this embodiment as being a hydraulic actuation means, is operable to move the piston 42 within the recess 14B in the outboard direction (left when viewing prior art FIG. 3). However, other types of actuation means 50, such as for example, electrical, pneumatic, and mechanical types, can be used.

The prior art disc brake assembly 10 also includes a dust boot seal 44 and an annular fluid seal 46. The dust boot seal 44 is formed from a flexible material and has a first end which engages an outboard end of the recess 14B. A second end of the dust boot seal 44 engages an annular groove formed in an outer side wall of the piston 42. A plurality of flexible convolutions are provided in the dust boot seal 44 between the first and second ends thereof. The dust boot seal 44 is provided to prevent water, dirt, and other contaminants from entering into the recess 14B. The fluid seal 46 is disposed in an annular groove formed in a side wall of the recess 14B and engages the outer side wall of the piston 42. The fluid seal 46 is provided to define a sealed hydraulic actuator chamber 48, within which the piston 42 is disposed for sliding movement. Also, the fluid seal 46 is designed to function as a "roll back" seal to retract the piston 42 within the recess 14B (right when viewing prior art FIG. 3) when the brake pedal is released.

The prior art disc brake assembly 10 further includes a rotor 50, which is connected to a wheel (not shown) of the vehicle for rotation therewith. The illustrated rotor 52 includes a pair of opposed braking discs 54 and 56 which are spaced apart from one another by a plurality of intermediate ribs or fins 58 in a known manner. The rotor 52 extends radially outwardly between the inboard friction pad 36 and the outboard friction pad 40.

When it is desired to actuate the prior art disc brake assembly 10 to retard or stop the rotation of the brake rotor 52 and the vehicle wheel associated therewith, the driver of the vehicle depresses the brake pedal (not shown). In a manner which is well known in the art the depression of the brake pedal causes pressurized hydraulic fluid to be introduced into the chamber 48. Such pressurized hydraulic fluid urges the piston 42 in the outboard direction (toward the left when viewing prior art FIG. 3) into engagement with the backing plate 34 of the inboard brake shoe 30. As a result, the friction pad 36 of the inboard brake shoe 30 is moved into frictional engagement with the inboard braking disc 54 of the rotor 52. At the same time, the caliper 12 slides on the pins 20 in the inboard direction (toward the right when viewing prior art FIG. 3) such that the outboard leg 16 thereof moves the friction pad 40 of the outboard brake shoe 32 into frictional engagement with the outboard braking disc 56 of the brake rotor 52. As a result, the opposed braking discs 54 and 56 of the rotor 52 are frictionally engaged by the respective friction pads 36 and 40 to slow or stop relative rotational movement thereof. The structure and operation of the prior art disc brake assembly 10 thus far described is conventional in the art.

Figure 4:
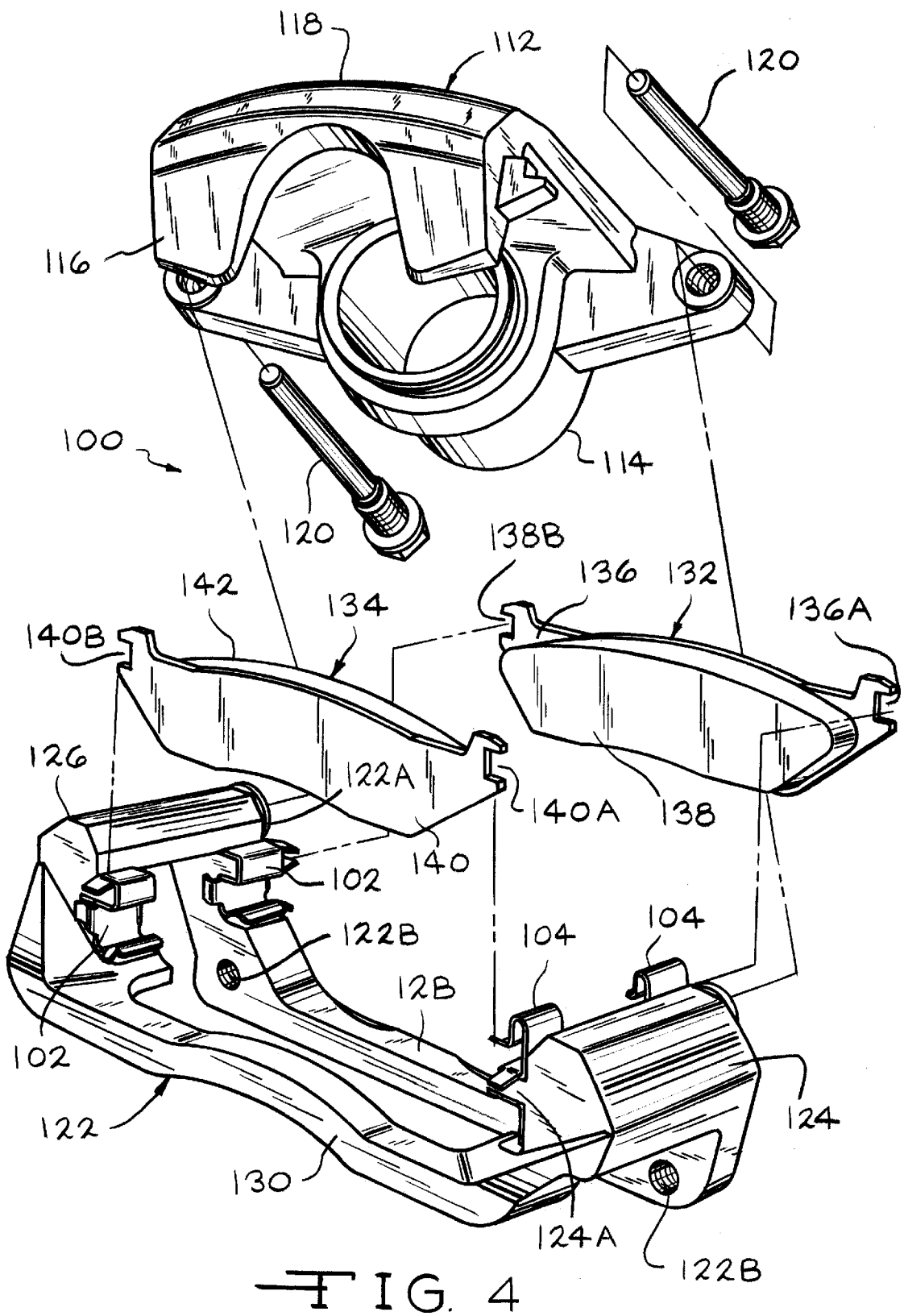
FIG. 4 is an exploded perspective view of selected components of a vehicle disc brake assembly including a plurality of damped pad springs in accordance with the present invention.

Referring now to FIG. 4, there is illustrated selected components of a disc brake assembly, indicated generally at 100, having a first pair of damped pad springs 102 and a second pair of damped pad springs 104 attached thereto in accordance with the present invention. The disc brake assembly 100 illustrated in FIG. 4 is a well known "Colette" sliding type of disc brake assembly and includes a generally C-shaped caliper 112, an anchor bracket 122, and a pair of friction pads 132 and 134. In this embodiment, the disc brake assembly 100 is illustrated as being for use on a front left wheel of the vehicle.

In this embodiment, the caliper 112 includes an inboard leg portion 114 and an outboard leg portion 116 which are interconnected by an intermediate bridge portion 118. The caliper 112 is slidably supported on a pair of pins 120 which extend into the anchor bracket 122. The anchor bracket 122 is, in turn, secured to a stationary component of the vehicle. Such a stationary component can be, for example, an axle flange (not shown), when the disc brake assembly 100 is installed for use on the rear of the vehicle, or a steering knuckle (not shown), when the disc brake assembly 100 is installed for use on the front of the vehicle. To accomplish this, the anchor bracket 122 includes a first pair of spaced apart non-threaded openings or blind holes 122A (only one of the openings 122A illustrated in FIG. 4), and a second pair of spaced apart openings threaded openings 122B. The openings 122A are adapted to receive an associated slide pin 120, and the openings 122B are adapted to receive a pair of bolts (not shown) which extend therethrough and which are received in threaded openings provided in the stationary vehicle component (not shown) to thereby secure the anchor bracket 122 to the stationary vehicle component. Alternatively, other known securing methods can be used to secure the brake caliper 112 to the anchor bracket 122 and/or to secure the anchor bracket 122 to the stationary vehicle component.

The anchor bracket 122 includes a pair of axially and outwardly extending arms 124 and 126 which are interconnected at their inboard ends by an inner tie bar 128, and which are interconnected at their outboard ends by an outer tie bar 130. In this embodiment, the arm 124 is at the "trailing" end of the disc brake assembly 100 and the arm 126 is at the "leading" end of the disc brake assembly 100.

Figure 6:
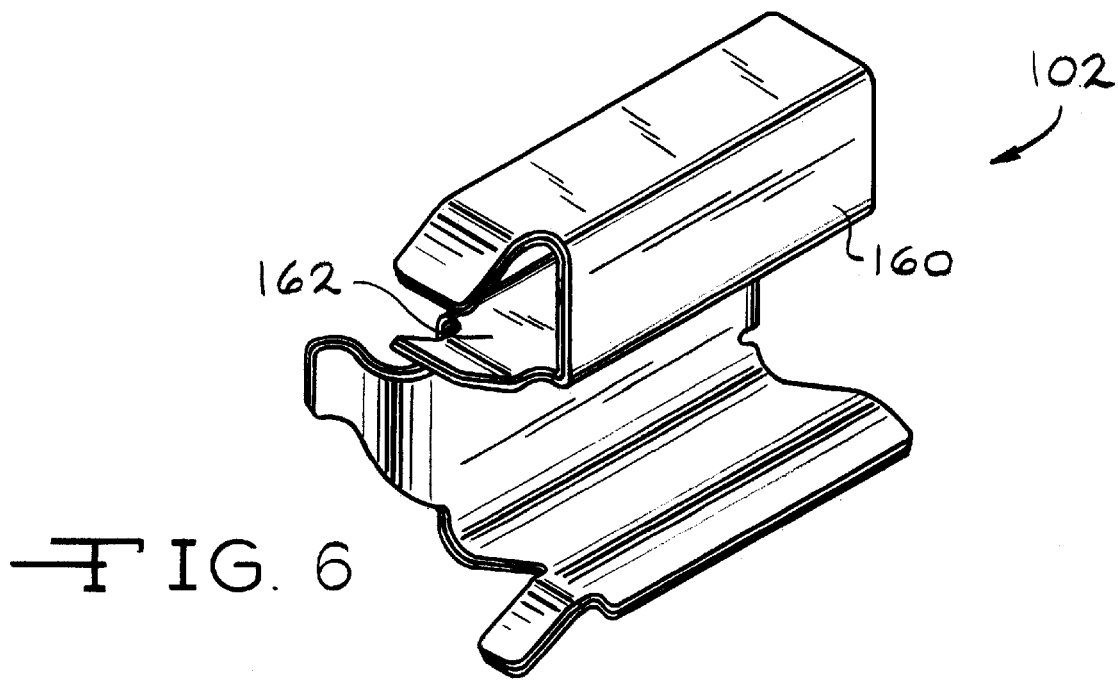
FIG. 6 is a perspective view of another one of the damped pad springs illustrated in FIG. 4.
Figure 7:
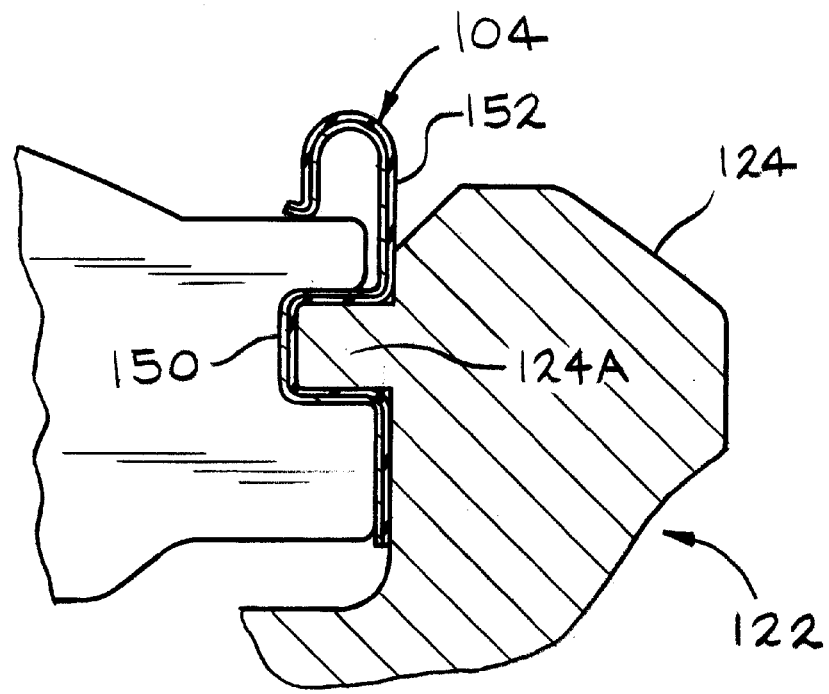
FIG. 7 is a sectional view of a portion of the vehicle disc brake assembly showing the damped pad spring illustrated in FIG. 5 in the installed position.

Each of the arms 124 and 126 includes a pair of spaced apart outwardly projecting guide rails 124A and 126A, respectively, formed thereon. In particular, the guide rails 124A and 126A are provided on the inner walls of the arms 124 and 126, respectively, and are parallel to one another. As best shown in FIGS. 6 and 7, in this embodiment the guide rails 124A and 126A have a generally a rectangular cross section. As will be discussed below, the guide rails 124A and 126A slidably support the inboard brake shoe 132 and the outboard brake shoe 134 having the damped pad springs 102 and 104 assembled therewith. Alternatively, the anchor bracket 122 can be constructed to include only one of the inner tie bar 128 or the outer tie bar 130 and the profile of the guide rails 124A and 126C can be other than illustrated if so desired.

The inboard brake shoe 132 includes a backing plate 136 and a friction pad 138. The inboard backing plate 136 includes opposed ends having notches or abutments 136A and 136B formed therein, for supporting the inboard brake shoe 132 on the guide rails 124A and 126A of the anchor bracket 122. The outboard brake shoe 134 includes a backing plate 140 and a friction pad 142. The outboard backing plate 140 includes opposed ends having notches or abutments 140A and 140B formed therein, for supporting the outboard brake shoe 134 on the guide rails 124A and 126A of the anchor bracket 122. Alternatively, the inboard brake shoe 132 can be supported on a brake piston of the disc brake assembly 110, while the outboard brake shoe 134 can be supported on the outboard leg portion 116 of the caliper 112. As will be discussed below, in the illustrated embodiment the notches 136A and 136B and 140A and 140B are generally rectangular shaped and are adapted to receive the associated damped pad springs 102 and 104 thereon prior to assembly of the friction pads 132 and 134 on the guide rails 124 and 126. Thus, it is preferred that the damped pad springs 102 and 104 are first installed on the guide rails 124 and 126 and thereafter the friction pads 132 and 134 installed. Also, the particular shape of the notches 136A and 136B and 140A and 140B can be other than illustrated if so desired.

Figure 5:
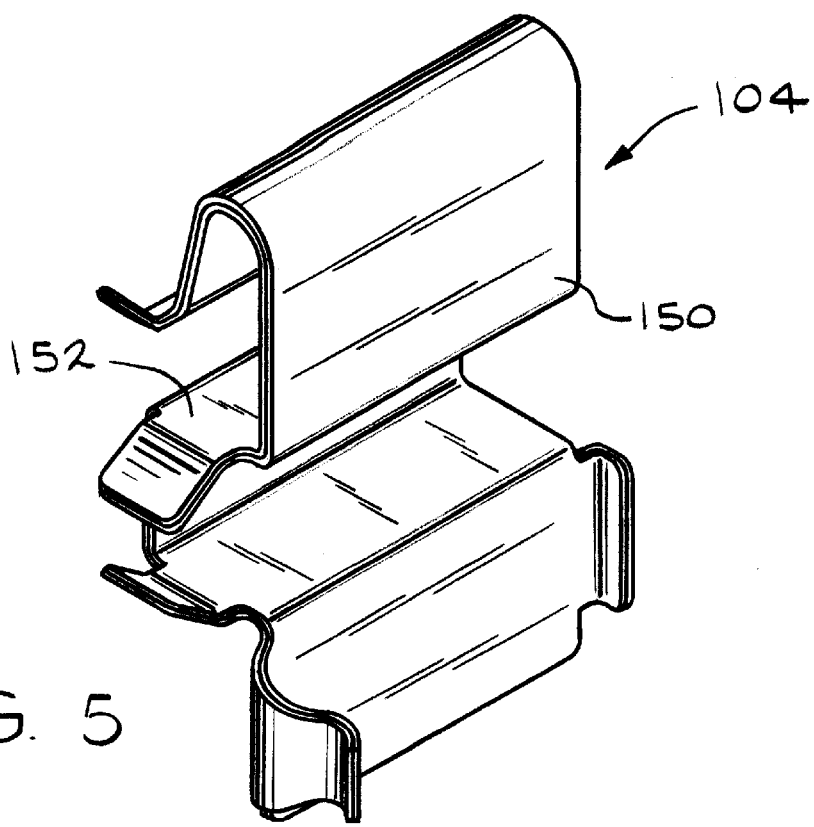
FIG. 5 is a perspective view of one of the damped pad springs illustrated in FIG. 4.
Figure 9:
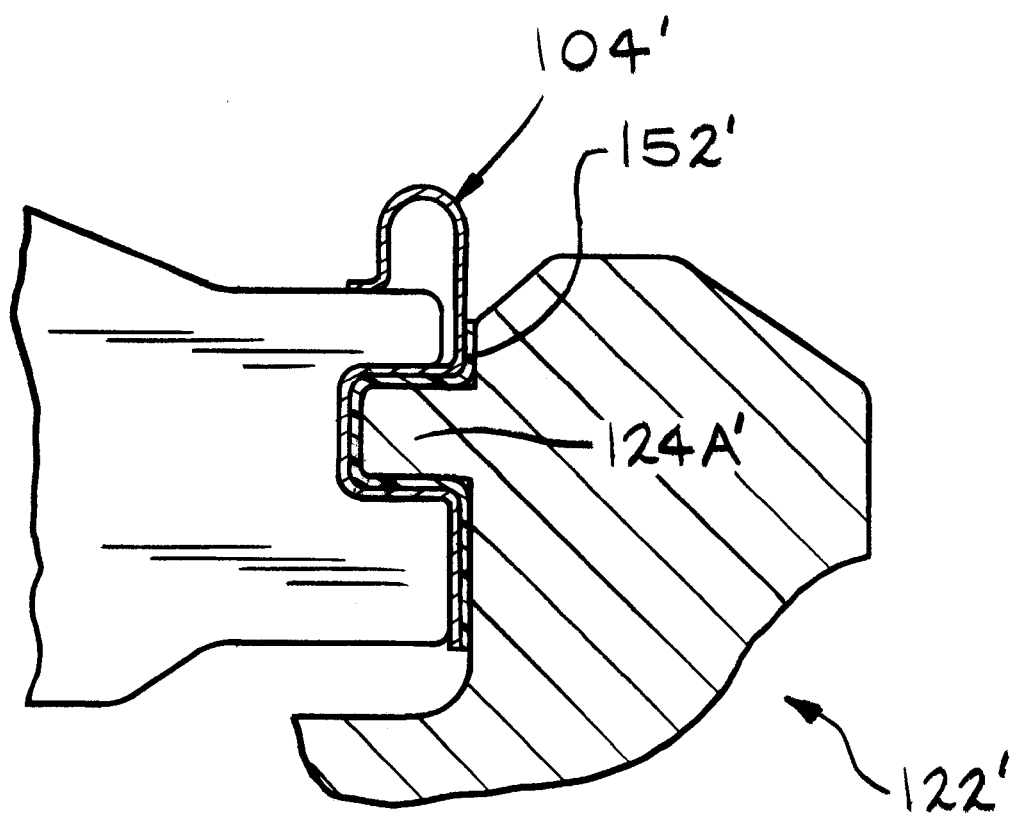
FIG. 9 is a sectional view similar to FIG. 7 showing an alternate embodiment of a damped pad spring in accordance with the present invention.

As best shown in FIGS. 5 and 7, the damped pad spring 104 is a multi-layered spring and includes an outer layer 150 and an inner layer 152. Preferably, the outer layer 150 is formed from a metal and defines a metal body, and the inner layer 152 is formed from a damping material 152. In the illustrated embodiment, the damping material 152 covers the entire inner surface of the metal body 150. In particular, the metal body 150 of the damping pad spring 104 is preferably formed from a strip of stainless steel, and the damping material 152 is vulcanized, bonded, glued, coated, or otherwise applied to the metal body 150. Preferably, the damping material 152 is applied to the stainless steel body 150 prior to the forming of the damped pad spring 104 into its desired final shape by a stamping operation. A preferred damping material 152 is Rubore MD-386 manufactured by Trelleborg Automotive of South Haven, Mich. Alternatively, the damping material 152 could cover less than the entire inner surface of the metal body 150. For example, the damping material 152 could cover the inner surface of the metal body 150 only at those portions which contact adjacent areas of the anchor bracket 122. In addition, the particular shape of the damped pad spring 104 can be other than illustrated. For example, the damped pad spring 104 could have a shape which is operative to enable it be disposed on one of the guide rails 24A and 26A of the anchor bracket 22 of the prior art disc brake assembly 10. Also, the material of the body 150 can be other than illustrated if so desired. Further, as shown in FIG. 9, a damping material 152' could be applied directly to the associated selected surface or surfaces of a guide rail 124A' of an anchor bracket 122' prior to the installation of an associated spring(s) 104' thereon.

Figure 8:
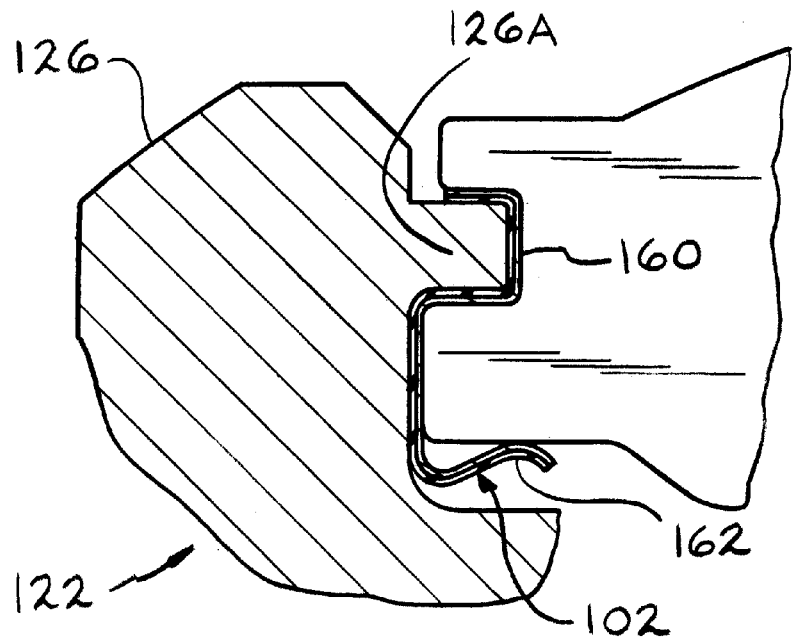
FIG. 8 is a sectional view of a portion of the vehicle disc brake assembly showing the damped pad spring illustrated in FIG. 6 in the installed position.

As best shown in FIGS. 6 and 8, the damped pad spring 102 is a multi-layered spring and includes an outer layer 160 and an inner layer 162. Preferably, the outer layer 160 is formed from a metal and defines a metal body, and the inner layer 162 is formed from a damping material 162. In the illustrated embodiment, the damping material 162 covers the entire inner surface of the metal body 160. In particular, the metal body 160 of the damping pad spring 102 is formed from a strip of stainless steel, and the damping material 162 is vulcanized to the metal body 160. Preferably, the damping material 162 is vulcanized to the stainless steel body 160 prior to the forming of the damped pad spring 102 into its desired final shape by a stamping operation. A preferred damping material 162 is Rubber MD-386 manufactured by Trelleborg Automotive of South Haven, Mich. Alternatively, the damping material 162 could be formed from other materials and/or could cover less than the entire inner surface of the metal body 160. For example, the damping material 162 could cover the inner surface of the metal body 160 only at those portions which contact adjacent areas of the anchor bracket 122. Also, the damping material 162 could be applied directly to the associated selected surface or surfaces of the anchor bracket 122 prior to the installation of the associated spring(s) thereon. In addition, the particular shape of the damped pad spring 102 can be other than illustrated. For example, the damped pad spring 102 could have a shape which is operative to enable it be disposed on one of the guide rails 24A and 26A of the anchor bracket 22 of the prior art disc brake assembly 10.

Although the damped pad springs 102 and 104 of the present invention have been described for use with the particular disc brake structure shown in the drawings, the invention can be used with other disc brake structures. For example, the damped pad springs 102 and 104 can be used with other kinds of floating type of disc brake assemblies (not shown) and/or with a fixed type of disc brake assembly (not shown).

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly comprising:

an anchor bracket adapted to be secured to a vehicle component; said anchor bracket including an outer surface;

a brake caliper adapted to be secured to said anchor bracket;

a pair of friction pads carried by said disc brake assembly and adapted to be disposed on opposite axial sides of an associated brake rotor;

actuation means for selectively moving said friction pads into frictional engagement with the rotor;

at least one pad spring carried by said disc brake assembly and disposed between said anchor bracket and at least one end of one of said pair of friction pads, said pad spring including an inner surface; and a damping material applied to one of said outer surface of said anchor bracket and said inner surface of said pad spring so as to be disposed between adjacent contacting areas of said outer surface of said anchor bracket and said inner surface of said pad spring to thereby reduce friction pad noise.

2. The disc brake assembly defined in claim 1 wherein said damping material is applied to at least selected portions of said outer surface of said anchor bracket.

3. The disc brake assembly defined in claim 1 wherein said damping material is applied to at least selected portions of said inner surface of said pad spring so as to define a multi-layered pad spring, said multi-layered pad spring including an outer layer disposed adjacent said friction pad and in contact with at least a portion thereof, and said inner layer disposed adjacent said anchor bracket and in contact with at least a portion thereof, said outer layer formed from a first material and said inner layer formed from said damping material.

4. The disc brake assembly defined in claim 3 wherein said first material of said outer layer is metal.

5. The disc brake assembly defined in claim 3 wherein said damping material of said inner layer covers the entire inner surface of said first material of said outer layer.

6. The disc brake assembly defined in claim 3 wherein said first material of said outer layer is a metal and said damping material is applied to said metal outer layer.

7. The disc brake assembly defined in claim 3 wherein said first material of said outer layer is a metal and said damping material is applied to said metal outer layer prior to the forming of said pad spring by a stamping operation.

8. The disc brake assembly defined in claim 3 wherein said first material of said outer layer is a metal and said damping material covering only those portions of said metal layer which contact adjacent areas of said anchor bracket.

9. A pad spring adapted for use with a disc brake assembly including an anchor bracket, a brake caliper secured to the anchor bracket, and a pair of friction pads carried by the disc brake assembly, said pad spring comprising:

a multi-layered pad spring adapted to be carried by the disc brake assembly and disposed between the anchor bracket and at least one end of the pair of friction pads, said multi-layered pad spring including an outer layer formed from a first material and an inner layer formed from a second material.

10. The pad spring defined in claim 9 wherein said first material of said outer layer is metal and said second material of said inner layer is a damping material.

11. The pad spring defined in claim 9 wherein said second material of said inner layer covers the entire inner surface of said first material of said outer layer.

12. The pad spring defined in claim 9 wherein said first material of said outer layer is a metal and said second material of said inner is a damping material, said damping material being vulcanized to said outer layer.

13. The pad spring defined in claim 9 wherein said first material of said outer layer is a metal and said second material of said inner layer is a damping material, said damping material being applied to said metal outer layer prior to the forming of said multi-layered pad spring by a stamping operation.

14. The pad spring defined in claim 9 wherein said first material of said outer layer is a metal and said second material of said inner layer is a damping material, said damping material covering only selected portions of said metal layer.

15. A pad spring adapted for use with a disc brake assembly including an anchor bracket, a brake caliper secured to the anchor bracket, and a pair of friction pads carried by the disc brake assembly, said pad spring comprising:

a multi-layered pad spring adapted to be carried by the disc brake assembly and disposed between the anchor bracket and at least one end of the pair of friction pads, said multi-layered pad spring including an outer layer formed from a metal material and an inner layer formed from a damping material, said inner damping material layer covering the entire inner surface of said metal outer layer.

16. The pad spring defined in claim 15 wherein said first material of said outer layer is a metal and said second material of said inner layer is a damping material, said damping material being vulcanized to metal outer layer.

17. The pad spring defined in claim 15 wherein said first material of said outer layer is a metal and said second material of said inner layer is a damping material, said damping material being applied to said metal outer layer prior to the forming of said multi-layered pad spring by a stamping operation.

* * * * *